(12) United States Patent
Ho et al.

(10) Patent No.: US 10,747,470 B2
(45) Date of Patent: Aug. 18, 2020

(54) SEMICONDUCTOR DEVICE WITH PSEUDO FLOW THROUGH SCHEME FOR POWER SAVINGS

(71) Applicant: Micron Technology, Inc., Boise, ID (US)

(72) Inventors: Michael V. Ho, Allen, TX (US); Ravi Kiran Kandikonda, Frisco, TX (US)

(73) Assignee: Micron Technology, Inc., Boise, ID (US)

( * ) Notice: Subject to any disclaimer, the term of this patent is extended or adjusted under 35 U.S.C. 154(b) by 69 days.

(21) Appl. No.: 15/976,724

(22) Filed: May 10, 2018

(65) Prior Publication Data

US 2019/0347042 A1    Nov. 14, 2019

(51) Int. Cl.
  *G06F 12/00* (2006.01)
  *G06F 3/06* (2006.01)

(52) U.S. Cl.
  CPC .......... *G06F 3/0659* (2013.01); *G06F 3/0604* (2013.01); *G06F 3/0625* (2013.01); *G06F 3/0673* (2013.01)

(58) Field of Classification Search
  CPC ...................................................... G11C 7/1006
  USPC .................................................. 711/E12.002
  See application file for complete search history.

(56) References Cited

U.S. PATENT DOCUMENTS

| | | | | |
|---|---|---|---|---|
| 6,975,558 B2* | 12/2005 | Farmwald | ............. | G06F 11/006 365/233.16 |
| 2009/0172270 A1* | 7/2009 | Kardach | ............. | G06F 12/0223 711/105 |
| 2010/0110805 A1* | 5/2010 | Yang | ...................... | G11C 5/066 365/191 |
| 2012/0151162 A1* | 6/2012 | Trantham | .................. | G06F 1/30 711/161 |
| 2015/0254022 A1* | 9/2015 | Oikawa | ................. | G06F 3/0659 711/103 |
| 2015/0378639 A1* | 12/2015 | Chien | .................... | G06F 3/0647 711/104 |
| 2016/0087618 A1* | 3/2016 | Niitsuma | ............... | H03K 5/135 365/233.11 |
| 2016/0162416 A1* | 6/2016 | Boyd | ...................... | G06F 13/28 711/202 |

* cited by examiner

*Primary Examiner* — Min Huang
(74) *Attorney, Agent, or Firm* — Perkins Coie LLP

(57) ABSTRACT

A dynamic random-access memory (DRAM) device includes memory banks configured to store data and provide access to the stored data; and a data control circuit coupled to the memory banks, the data control circuit configured to: determine a pointer based on a received command, wherein the pointer corresponds to a target memory bank associated with the received command, and route a set of bits to or from the target memory bank using the pointer. In the long burst length and page mode operations where the array access is targeted in certain Bank Group, the pointer is generated and then allow the groups of data bits flowing through the center freely. This pseudo flow through scheme is low power and fast speed by removing the control of gating commands at each stage of the data path during Read and Write operations.

20 Claims, 6 Drawing Sheets

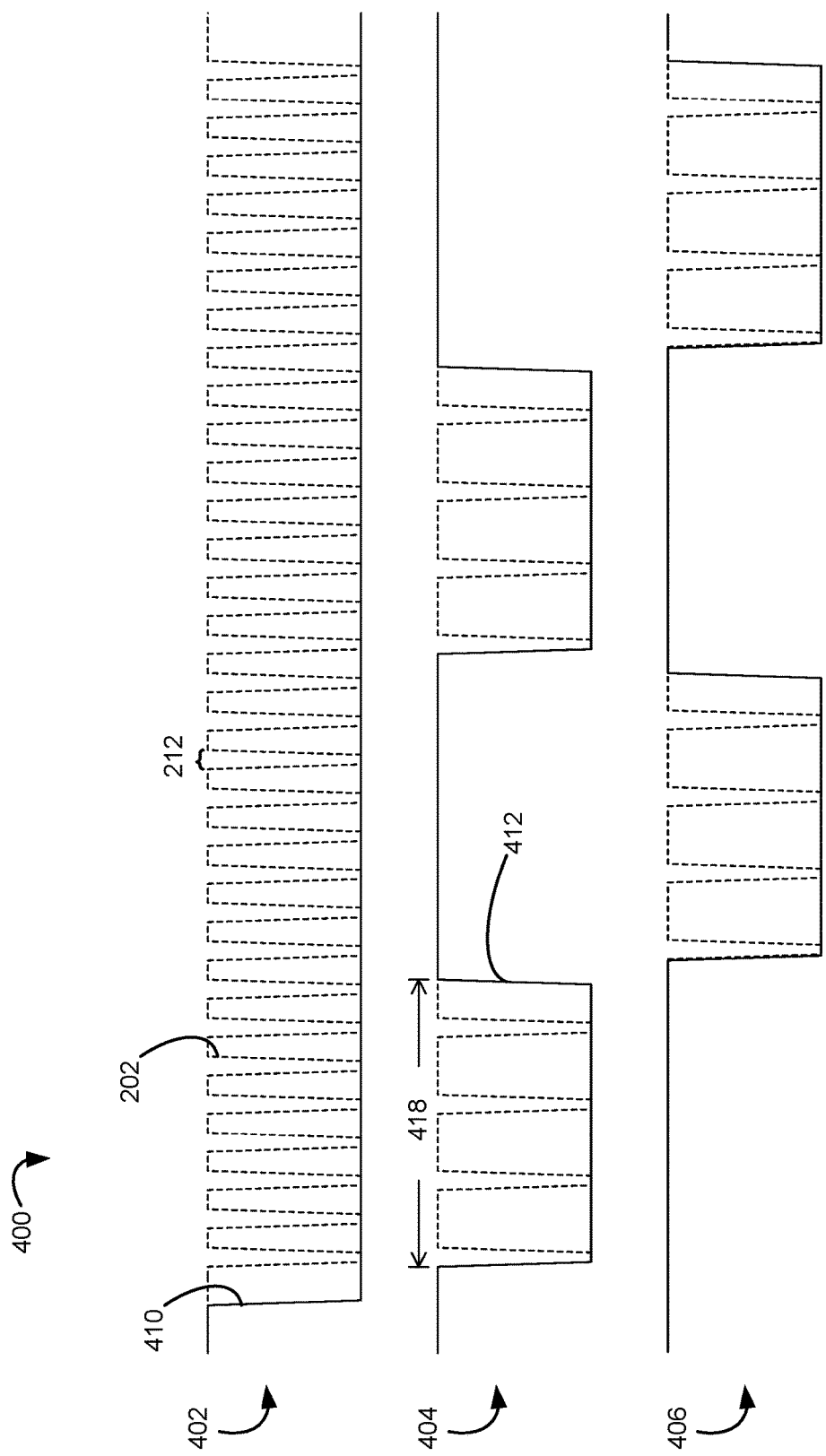

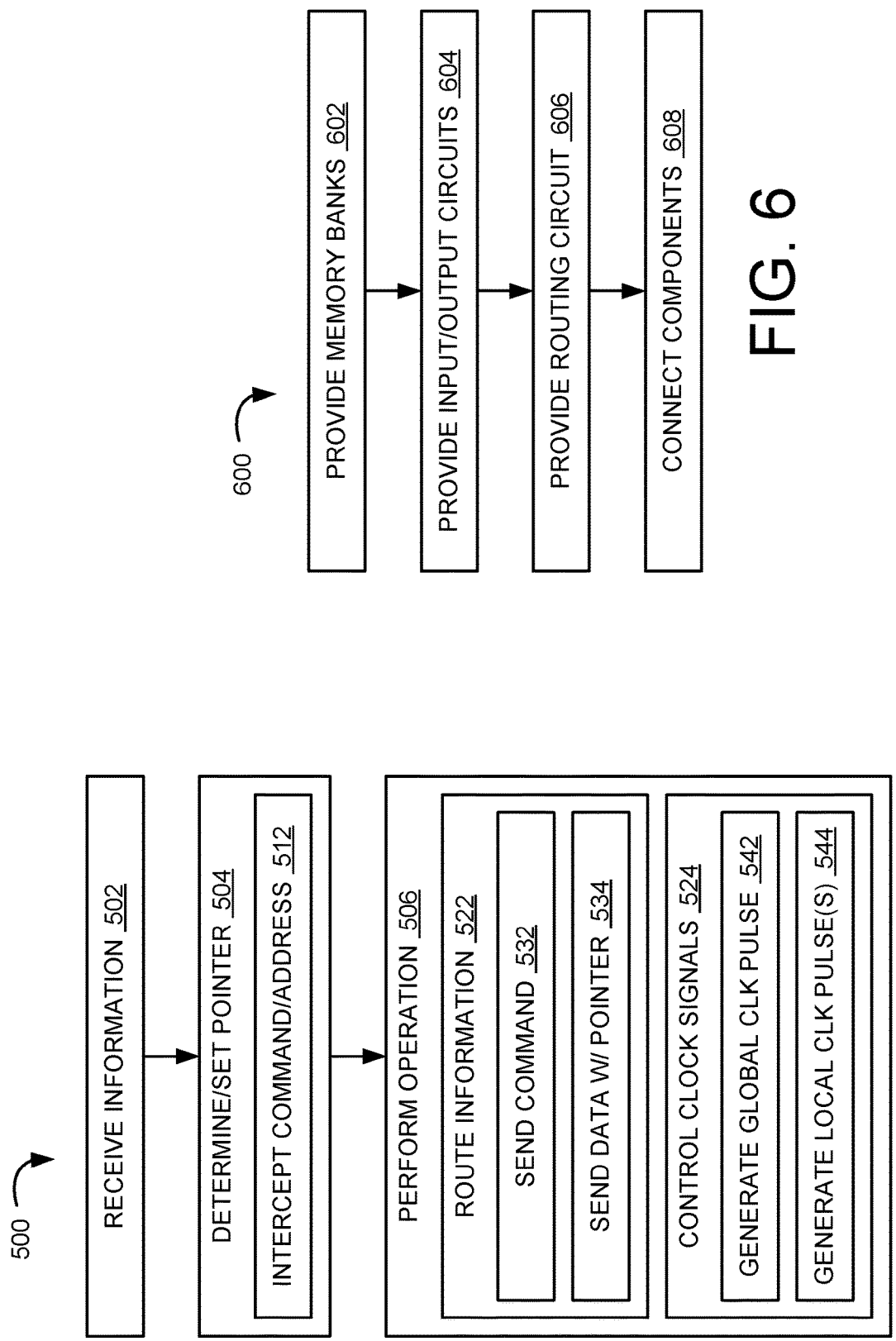

SEMICONDUCTOR DEVICE WITH PSEUDO FLOW THROUGH SCHEME FOR POWER SAVINGS

TECHNICAL FIELD

The disclosed embodiments relate to memory devices, and, in particular, to memory devices with a signal management mechanism.

BACKGROUND

Memory systems can employ memory devices to store and access information. The memory devices can include volatile memory devices, non-volatile memory devices, or a combination device. Memory devices, such as dynamic random-access memory (DRAM), can utilize electrical energy to store and access data. The memory devices can include Double Data Rate (DDR) RAM devices that implement DDR interfacing scheme (e.g., DDR4, DDR5, etc.) for high-speed data transfer.

FIG. 1 illustrates a block diagram of a memory device 100 (e.g., a DRAM device) that utilize electrical energy to store and access data. For example, the memory device 100 can include memory banks 102 that are organized/configured according to one or more bank groups 104. Each of the bank groups 104 can include a set of two or more memory banks 102. In some embodiments, each of the bank groups 104 can include a set of four or eight memory banks 102.

The memory device 100 can further include an input/output (I/O) circuit 106 configured to communicate data (e.g., DQ, RDQS, DBI, DMI, etc.), command, and/or address signals. In some embodiments, the I/O circuit 106 can include circuits (e.g., receivers, pads, etc.) configured to process a first data unit 112 (e.g., an upper byte of data), a second data unit 114 (e.g., a lower byte of data), etc. For example, the memory device 100 may communicate the data in units of 64 or 128 bits. The first data unit 112 can include an upper portion (e.g., an upper nibble, an upper byte, an upper word/half, etc.) of the 64/128 bit data units. The second data unit 114 can include a lower portion (e.g., a lower nibble, a lower byte, a lower word/half, etc.) of the 64/128 bit data units. Also, the "upper" and the "lower" portions can correspond to a bit order, such as corresponding to most significant bit(s) and the least significant bit(s), respectively. The first data unit 112 and the second data unit 114 can include non-overlapping portions of the communicated data unit.

In some embodiments, the I/O circuit 106 can include a command-address decoder 316. The command-address decoder 116 can be configured to process commands and/or addresses. For example, the command-address decoder 116 can process the address signal, such as by supplying a decoded row address signal (XADD) and/or a decoded column address signal (YADD), supplying the bank address signal (BADD), etc. to corresponding decoders. Also, the command-address decoder 116 can process commands and generate various internal signals/commands for performing memory operations.

The communicated data, command, address, etc. can be routed to/from the corresponding location (e.g., the particular/designated set of data cells). In some embodiments, the I/O circuit 106 can include a center hub 122, bank logics 124, etc. The center hub 122 can be configured to perform the bank group or group-level control. The bank logic circuits 124 can be configured to perform the bank-level control. The center hub 122, the bank logic circuitry 124, etc. can include a set of drivers (e.g., one-directional drivers and/or bi-directional drivers) for communicating the data with the memory banks 102.

The center hub 122 and/or the bank logic circuits 124 can perform the control operations according to one or more clock/timing signals. For example, the memory device 100 (e.g., the center hub 122 and/or the bank logic circuits 124) can utilize a global driver clock signal, a global multiplexer clock signal, one or more group driver clock signals, etc.

FIG. 2 illustrates a timing diagram 200 of a memory device (e.g., the memory device 100 of FIG. 1). The timing diagram 200 can illustrate a relationship between a global clock signal 202 (e.g., the global driver clock signal, the global multiplexer clock signal, etc.) and one or more local/sectional (e.g., bank-level and/or bank group-level) clock signals, such as a first group clock signal 204, a second group clock signal 206, etc.

The global clock signal 202 can be an overall timing signal configured to coordinate multiple different drivers/multiplexers in the memory device 100. The memory device 100 can generate the local/sectional clock signals to control operations at individual sections (e.g., at the individual bank-group or bank). For example, the first group clock signal 204 can control operations (e.g., operations for a driver, a multiplexer, a routing circuit, a buffer, other components, etc.) for a first bank group (e.g., BG0) or a first memory bank. Also, the second group clock signal 206 can control operations for a second bank group (e.g., BG1) or a second memory bank. The local/sectional clock signals can be aligned with the global clock signal 202. In some embodiments, the local/sectional clock signals can be contemporaneous with every other clock pulses 212 in the global clock signal 202. As such, a global clock period 214 can be shorter than a local clock period 216. Also, the local clock period 216 can be a multiple (e.g., double) of the global clock period 214.

The timing diagram 200 can perform the memory operations (e.g., write) to the memory bank/cells during a processing duration 218. The processing duration 218 can include a set of pulses or periods (e.g., a quantity of global clock signals 202 and a different quantity of the local clock periods 216, etc.). For example, the processing duration 218 can include four pulses and four clock periods 214 for processing one or more bytes.

While each of the clock pulses and the corresponding voltage transitions (e.g., edges), the pulses/transitions also consume power. Further, with technological advancements in other areas and increasing applications, the market is continuously looking for faster and more efficient devices. To meet the market demand, the semiconductor devices are being pushed to the limit. As the signal/processing rates increase, the clock pulses may consume increasing amounts of power. In view of the ever-increasing commercial competitive pressures, along with growing consumer expectations and the desire to differentiate products in the marketplace, it is increasingly desirable that answers be found to these problems. Additionally, the need to reduce costs, improve efficiencies and performance, and meet competitive pressures adds an even greater pressure to find answers to these problems.

BRIEF DESCRIPTION OF THE DRAWINGS

FIG. 4 illustrates a timing diagram of a memory device in accordance with an embodiment of the present technology.

FIG. 5 illustrates a flow diagram illustrating an example method of operating a memory device in accordance with an embodiment of the present technology.

FIG. 6 illustrates a flow diagram illustrating an example method of manufacturing a memory device in accordance with an embodiment of the present technology.

DETAILED DESCRIPTION

As described in greater detail below, the technology disclosed herein relates to memory devices, systems with memory devices, and related methods for managing signals internal to the memory devices or systems. For example, the memory devices (e.g., DRAM) or systems can manage the internal signals by reducing transitions for clock signals, command signals, location signals (e.g., bank identifier signal, address signals, etc.), data signals, etc. The device can operate, such as to store (e.g., write) or access (e.g., read) data, in burst mode (e.g., dedicated operation on a length of information, such as 4 bits, 8 bits, etc., without interruption) or page mode (e.g., reading or writing to same bank group). When operating in the burst mode or the page mode, the device can use pointers, such as bank group information and/or read/write information, to perform the operation and control/hold one or more of the signals instead of toggling the signals. As a result, the memory devices can reduce the power consumption by reducing the toggling of the signals.

In some embodiments, when external read or write commands are given, the internal data can go through a First-in, First out (FIFO) flip flops. Afterwards, the circuit for processing read command can include a parallel to serial FIFO and the circuit for processing write command can include a serial to parallel FIFO. After the FIFO, the data can reach a center portion, where clocks are used to latch with coming data, such as for setup and hold times, and to manipulate the data according to predetermined functions. Before processing the data signal, the memory device can detect and/or generate the pointers based on the information or commands that precede the data signal. Accordingly, a series/set of bits of the data signal for one bank group can flow through without clocks until new command or a different bank group is processed.

Figure 3:
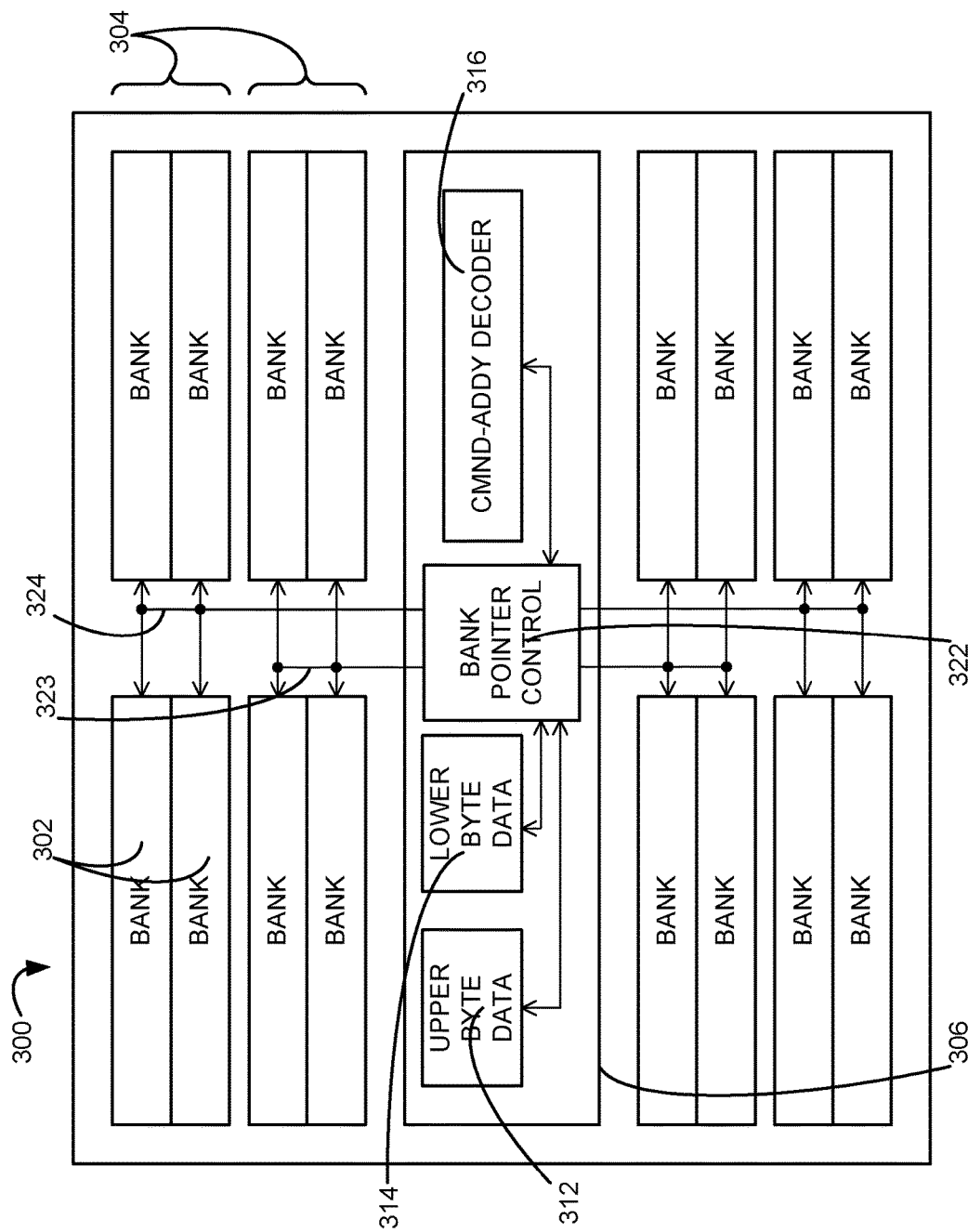
FIG. 3 illustrates a block diagram of a memory device in accordance with an embodiment of the present technology.

FIG. 3 illustrates a block diagram of a memory device 300 (e.g., a semiconductor storage device) in accordance with an embodiment of the present technology. For example, the memory device 300 can include a DRAM device, such as a DDR4 or a DDR5 device, or a portion thereof.

The memory device 300 can include memory banks 302 that are organized/configured according to one or more bank groups 304. Memory banks may include a plurality of word lines (WL), a plurality of bit lines (BL), and a plurality of memory cells arranged at intersections of the word lines and the bit lines. Memory cells can include any one of a number of different memory media types, including capacitive, magnetoresistive, ferroelectric, phase change, or the like. Each of the bank groups 304 can include a set of two or more memory banks 302. In some embodiments, each of the bank groups 304 can include a set of four or eight memory banks 302.

The memory device 300 can further include an input/output (I/O) circuit 306 configured to communicate data signals (e.g., DQ, RDQS, DBI, DMI, etc.). In some embodiments, the I/O circuit 306 can include circuits (e.g., receivers, pads, etc.) configured to process a first data unit 312 (e.g., an upper byte of data), a second data unit 314 (e.g., a lower byte of data), etc. For example, the memory device 300 may communicate the data in units of 64 or 128 bits. The first data unit 312 can include an upper portion (e.g., an upper nibble, an upper byte, an upper word/half, etc.) of the 64/128 bit data units. The second data unit 314 can include a lower portion (e.g., a lower nibble, a lower byte, a lower word/half, etc.) of the 64/128 bit data units. Also, the "upper" and the "lower" portions can correspond to a bit order, such as corresponding to most significant bit(s) and the least significant bit(s), respectively. The first data unit 312 and the second data unit 314 can include non-overlapping portions of the communicated data unit.

In some embodiments, the I/O circuit 306 can include a command-address decoder 316. The command-address decoder 316 can be configured to process commands and/or addresses. For example, the command-address decoder 316 can process the address signal, such as by supplying a decoded row address signal (XADD) and/or a decoded column address signal (YADD), supplying the bank address signal (BADD), etc. to corresponding decoders. Also, the command-address decoder 316 can process commands and generate various internal signals/commands for performing memory operations.

The communicated data, command, address, etc. can be routed to/from the corresponding location (e.g., the particular/designated set of data cells). In some embodiments, the I/O circuit 306 can include a bank-pointer control circuit 322 configured to implement the signal routing control (e.g., bank-level control and bank-group level control). The bank-pointer control circuit 322 can be coupled (e.g., directly, without any intervening circuitry) to the bank groups 304, the memory banks 302, etc. For example, a group connection bus 332 and/or a bank connection bus 334 can connect the bank-pointer control circuit 322 to the memory banks 302. The memory device 300 can include the bank-pointer control circuit 322 connected to the memory banks 302 directly through the connectors and without any logic (e.g., the bank logic circuits 124) or circuitry components between the two components.

In some embodiments, the bank-pointer control circuit 322 can include bi-directional control and drivers. Also, the bank-pointer control circuit 322 can include logic control that is shared between multiple memory banks and/or bank groups. Accordingly, the logic and the control circuitry can share drivers in communicating to multiple banks or bank groups. In some embodiments, the I/O circuit 306 (e.g., the bank-pointer control circuit 322) can intercept the command and/or address for local control. The command can continue to upper/lower DQ for global control. The bank-pointer control circuit 322 can be configured to reduce transitions for clock signals, command signals, location signals (e.g., bank identifier signal, address signals, etc.), data signals, etc. For burst mode or page mode operations, the bank-pointer control circuit 322 and/or the memory banks 302 can utilize (e.g., generate and/or detect) pointers to direct a consecutive grouping of bits to/from a location. The bank-pointer control circuit 322 can change/update the pointers when the bank-group information changes, which can be relatively minimal during page mode operation (e.g., bank access to the multiple columns in the same bank group) or burst length (e.g., eight bits are accessed to the same bank group). Based on directing/routing the information/bits, the information can flow through without clock signals until new command or different set of information for another bank group arrives. As such, the bank-pointer control circuit 322 can reduce the transitions in the clock signals. By using the pointers to guide the data flow, the memory device can reduce the power consumption, such as the power consumed due to clock transitions. Further, the memory device can increase the communication speed, such as for the trailing bits. The memory device can set the pointer based on the first bit, and using the pointer, the memory device can keep the path open to subsequent bits.

FIG. 4 illustrates a timing diagram 400 of a memory device (e.g., the memory device 300 of FIG. 3) in accordance with an embodiment of the present technology. The timing diagram 300 can correspond to timing/clock signals associated with burst mode or page mode operations (e.g., read, write, erase, etc.). The timing diagram 400 can illustrate a relationship between a global flow-through clock 402 (e.g., the global driver clock/enable signal, the global multiplexer clock/enable signal, etc.) and one or more local/sectional clock/enable signals, such as a first flow-through clock 404, a second flow-through clock 406, etc.

Figure 2:
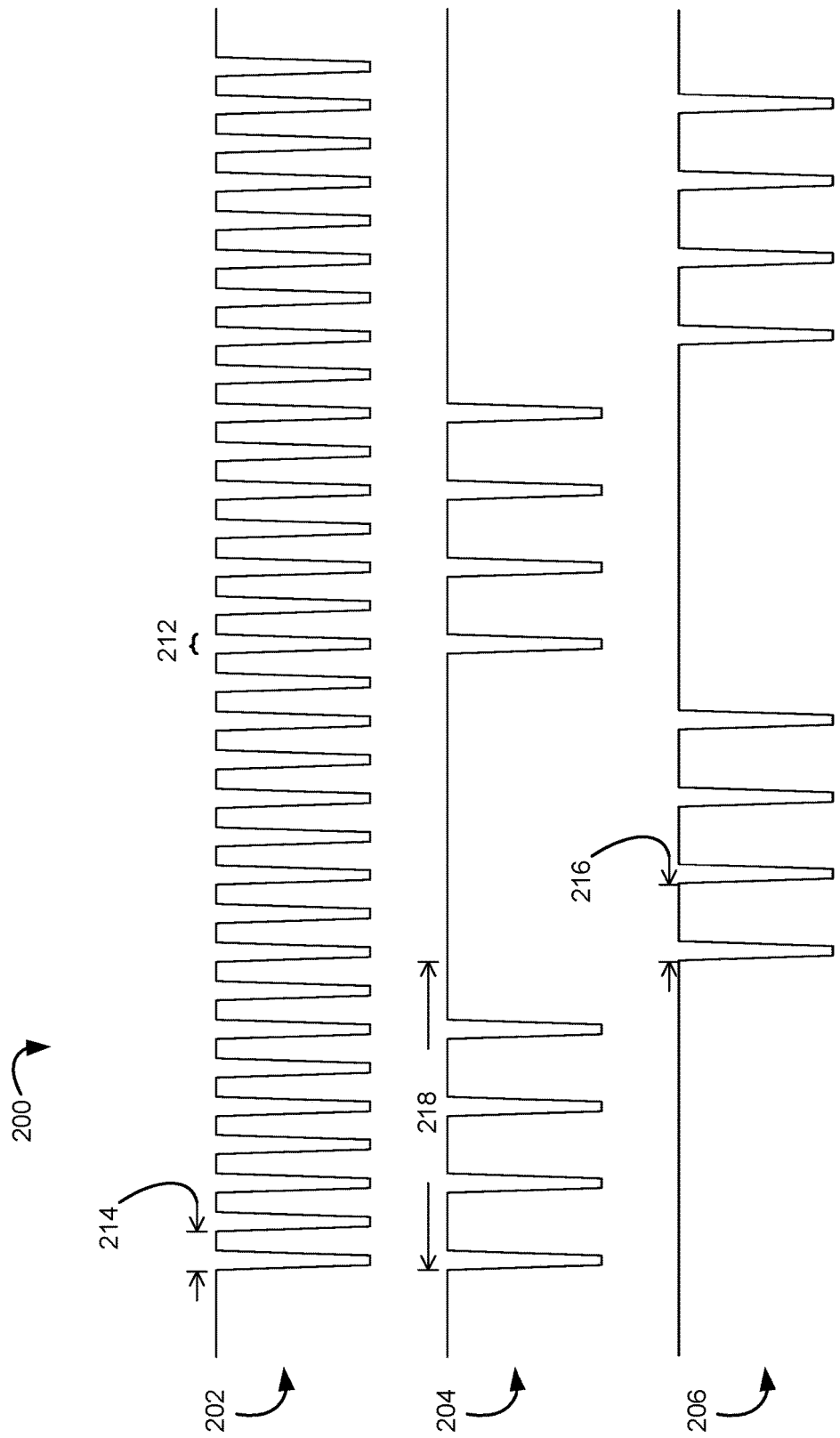
FIG. 2 illustrates a timing diagram of a memory device.

The global flow-through clock 402 can be an overall timing signal configured to coordinate multiple different drivers/multiplexers in the memory device 300. However, since the bank-pointer control circuit 322 uses pointers to allow the information to flow through (i.e., unlike the center hub 122 of FIG. 2), the global flow-through clock 402 can include a single pulse 410 or enable signal. As such, the global flow-through clock 402 can replace the multiple clock pulses 212 of the global clock signal 202 (shown using dashed lines in FIG. 4 for comparison purposes).

The memory device 300 can generate the local/sectional flow-through clock signals to control operations at individual sections (e.g., at the individual bank-group or bank). For example, the first flow-through clock 404 can control operations (e.g., operations for a driver, a multiplexer, a routing circuit, a buffer, other components, etc.) for a first bank group (e.g., BG0) or a first memory bank. The second flow-through clock 406 can control operations for a second bank group (e.g., BG1) or a second memory bank. Since the bank-pointer control circuit 322 uses pointers to allow the information to flow through, the local/sectional flow-through clock signals can be separate/independent from portions/edges of the global flow-through clock 402. Like the global flow-through clock 402, the local/sectional flow-through clock signals (e.g., the first flow-through clock 404, the second flow-through clock 406, etc.) can include a single pulse 412 or enable signal during a processing duration 418. As such, the local/sectional flow-through clock signals can utilize the single pulse or enable signal to replace the local/sectional clock signals of the group clock signals (e.g., the first group clock signal 204 of FIG. 2, the second group clock signal 206 of FIG. 2, etc.).

Since the burst mode and the page mode both access the same bank for the grouping of bits, the bank-pointer control circuit 322 can generate the global flow-through clock 402, the first flow-through clock 404, the second flow-through clock 406, etc. instead of the signals that include pulses/transitions. The bank-pointer control circuit 322 can use the pointer to determine array bank access and route the information accordingly. A command decoder (not shown) can issue commands for every read or write command. Since page mode limits operations to a read or a write command, the bank-pointer control circuit 322 can assert the command (e.g., the first flow-through clock 404, the second flow-through clock 406, etc.) once at the beginning of the page mode and de-assert at the end of it. As a result, clocks can be turned off for banks that are not being accessed for a given command, making the data flow through with no additional gating for the bank being accessed.

FIG. 5 illustrates a flow diagram illustrating an example method of operating a memory device (e.g., the memory device 300 of FIG. 3) in accordance with an embodiment of the present technology. The example method can be for operating the bank-pointer control circuit 322 of FIG. 3. Further, the example method can correspond to the timing diagram 400 of FIG. 4. The example method can be for performing a write operation or a read operation for a burst operation or a page mode operation.

At block 502, the memory device 300 can receive information corresponding to the operation. For example, the memory device 300 can receive, such as through the command-address pads, data pads, etc., a command, an address, a payload data, etc. associated with a data operation (e.g., read, write, etc.). The memory device 300 can further receive a consecutive set of bits (e.g., data bits) that correspond to a page mode operation or a burst mode operation.

At block 504, the memory device 300 (e.g., the bank-pointer control circuit 322) can determine a pointer that corresponds to the operation (e.g., the command and/or the address). The bank-pointer control circuit 322 can determine the pointer that corresponds to a target memory bank (e.g., a storage location serving as a source for the read or a destination for the write). Determining the pointer can be based on intercepting the command and/or the address, as represented at block 512. The bank-pointer control circuit 322 can intercept the information from the command-address decoder 316 or the corresponding pads. The bank-pointer control circuit 322 can identify the target memory bank based on the intercepted address and/or the intercepted command.

At block 506, the memory device 300 can perform the commanded operation. In performing the operation, the bank-pointer control circuit 322 can route information to/from various components as illustrated at block 522. For example, the bank-pointer control circuit 322 can send the command, such as illustrated at block 532, to one or more data pads/masks (e.g., corresponding to the first data unit 312 of FIG. 3, the second data unit 314 of FIG. 3, etc.) for global control of the data operation. Also, the bank-pointer control circuit 322 can route, such as illustrated at block 534, the set of consecutive bits (e.g., the first data unit 312 of FIG. 3, the second data unit 314 of FIG. 3, etc.) to/from the target memory bank using the pointer.

At block 524, the memory device 300 can control clock signals in performing the operation. For example, at block 542, the memory device 300 (e.g., the bank-pointer control circuit 322) can generate a global control clock (e.g., the global flow-through clock 402 of FIG. 4, such as instead of the global clock signal 202 of FIG. 2). Also, at block 544, the memory device 300 can generate a local control clock (e.g., the local flow-through clock, such as the first flow-through clock 404 of FIG. 4 and/or the second flow-through clock 406 of FIG. 4). The memory device 300 can generate a single pulse for the global/local control clock. The memory device 300 can generate the pulse that is sustained without any transitions over multiple clock periods, sustained for a designated duration (e.g., the processing duration 216 of FIG. 2). The memory device 300 can accordingly stop toggling the global clock, the local control clock, etc. based on using the pointer. The memory device 300 can further turn off the clock signals for the bank groups that do not include the targeted location (e.g., the memory bank).

Using the pointer to direct the data and eliminating the clock transitions provides reduced power consumption for the memory device 300. Since operations for the burst mode and/or the page mode requires that information (e.g., bits) are communicated in consecutive sets, individual timing for the set of information is not necessary. As such, signal toggling can be eliminated during the burst mode/page mode operations. Further, the memory device 300 can stop toggling the clock signals for memory banks that are not targeted by the operation. The stopped toggling of the signals can reduce the power consumption.

Also, the bank-pointer control circuit 322 configured to manage the signals as discussed above provides reduced complexity for the memory device 300, leading to lower manufacturing cost and lower failure rates. The bank-pointer control circuit 322 can replace the logic circuits used to route the signal to the memory banks. Also, the bank-pointer control circuit 322 can include logic and drivers that are each shared for multiple memory banks or bank groups. The removal of the logic circuits and the shared components can reduce the circuit stages and reduce global and local routings.

FIG. 6 illustrates a flow diagram illustrating an example method 600 of manufacturing a memory device in accordance with an embodiment of the present technology. The method 600 can be for manufacturing the memory device 300 of FIG. 3, such as a DDR DRAM device.

At block 602, a set of memory banks (e.g., the memory banks 302 of FIG. 3) can be provided. Providing the memory banks can include providing the memory banks 302 organized into the bank groups 304. In some embodiments, providing the memory banks 302 can include attaching storage devices/cells to a frame, a base, a chassis, a substrate, etc. In some embodiments, providing the memory banks 302 can include forming the memory cells, such as using semiconductor-level or wafer-level processes.

At block 604, a signal control circuit (the bank-pointer control circuit 322 of FIG. 3) can be provided. Providing the memory banks can include providing the bank-pointer control circuit 322 configured to determine a pointer, route signals, control clocks, etc. as discussed above. In some embodiments, providing the bank-pointer control circuit 322 can include attaching storage devices/cells to a frame, a base, a chassis, a substrate, etc. In some embodiments, providing the bank-pointer control circuit 322 can include forming the memory cells, such as using semiconductor-level or wafer-level processes. In some embodiments, providing the bank-pointer control circuit 322 can include forming, such as using semiconductor-level or wafer-level processes, the shared drivers, the shared logic, control circuitry, etc. In some embodiments, providing the bank-pointer control circuit 322 can include forming the bank-pointer control circuit 322 at a central portion (e.g., away from peripheral edges) of a semiconductor die. In some embodiments, providing the bank-pointer control circuit 322 can include programming gates/connections, loading instructions, etc. to perform the functions discusses above.

At block 606, input/output circuits can be provided. For example, the I/O circuit 306 of FIG. 3, the command-address decoder 316 of FIG. 3 and/or the corresponding pads, the data masks (e.g., corresponding to the first data unit 312, the second data unit 314, etc. of FIG. 3), etc. can be provided.

Figure 1:
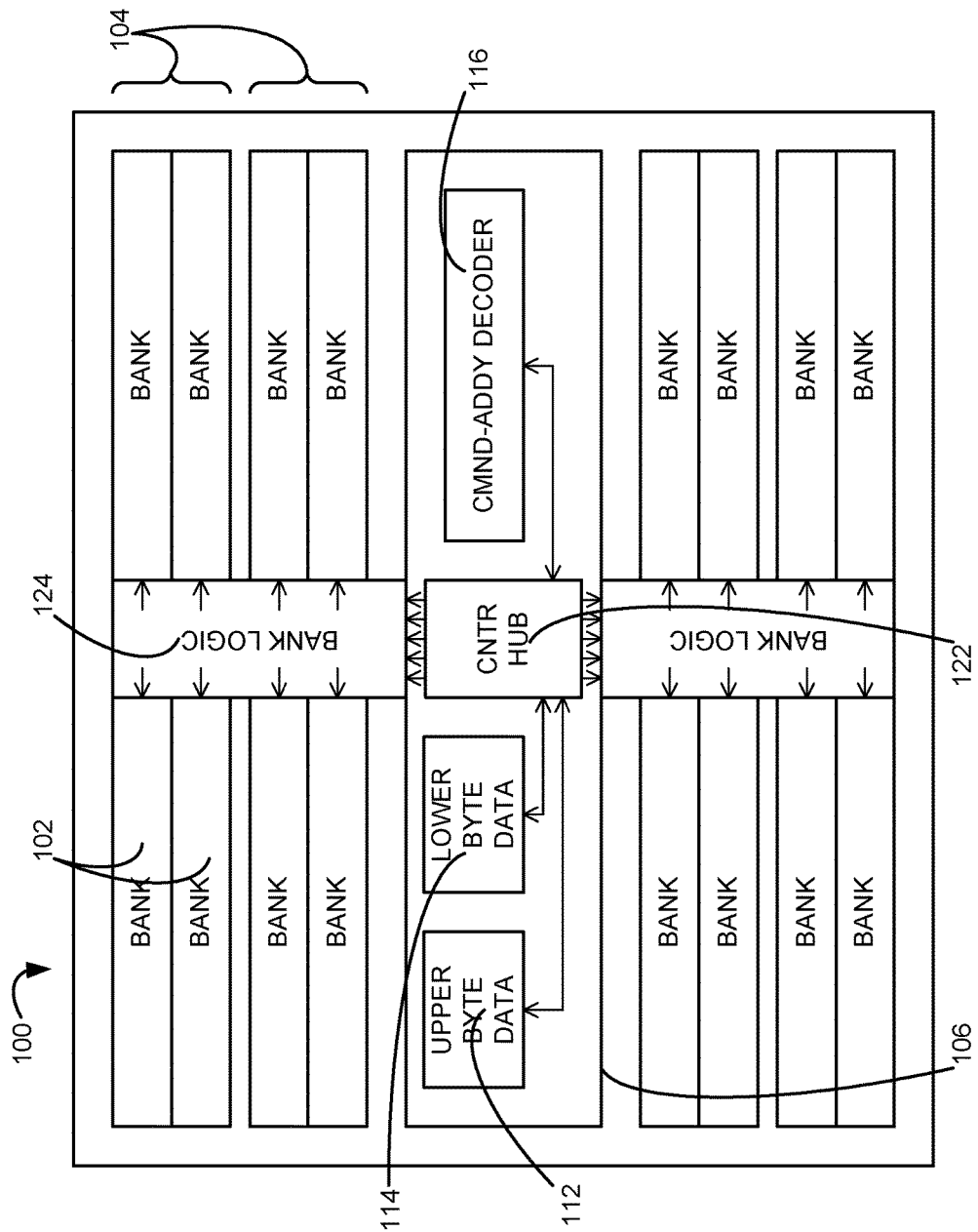
FIG. 1 illustrates a block diagram of a memory device.

At block 608, the circuits can be connected. The circuits (e.g., the memory banks 302, the command-address decoder 316, the data masks, the bank-pointer control circuit 322, etc.) can be connected using electrical conductors, such as traces, wires, buses, cables, etc. In some embodiments, the bank-pointer control circuit 322 and the memory banks 302 can be directly connected using electrical conductors, and without any other intervening components (e.g., without the bank logic 124 of FIG. 1).

Figure 7:
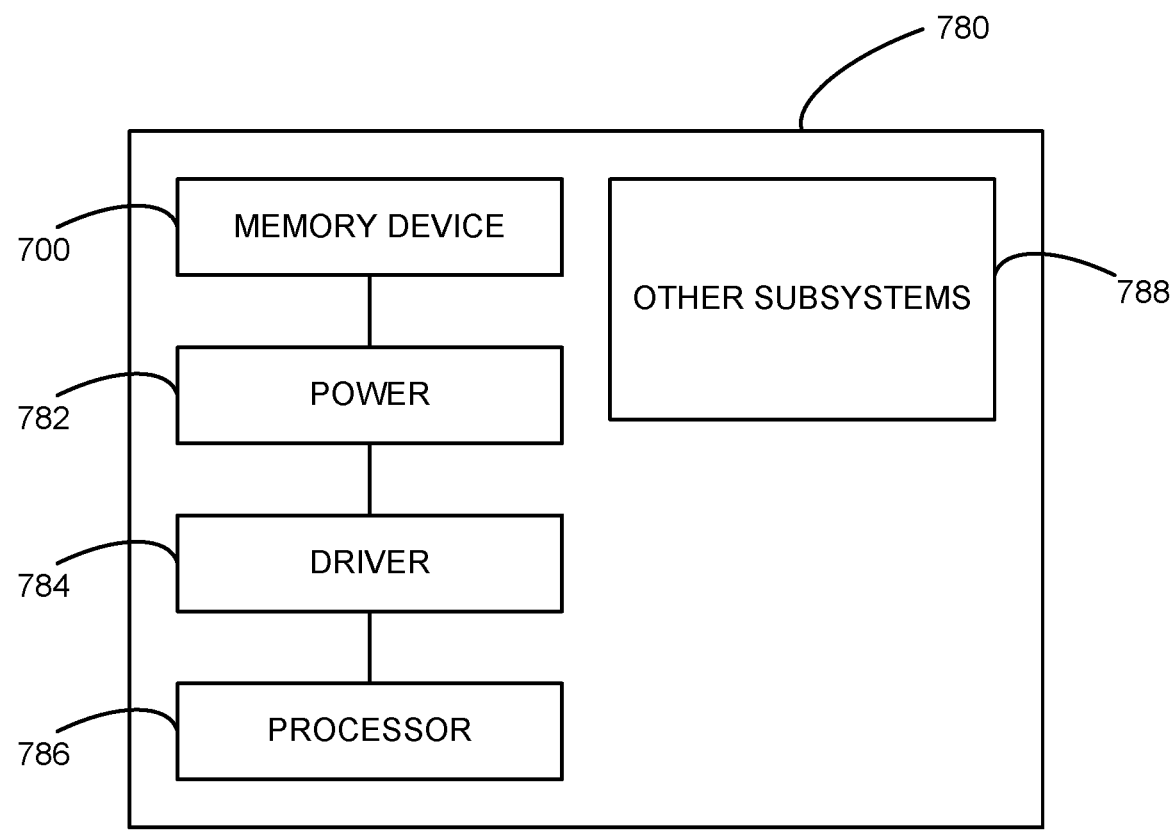
FIG. 7 is a schematic view of a system that includes a memory device in accordance with an embodiment of the present technology.

FIG. 7 is a schematic view of a system that includes a memory device in accordance with embodiments of the present technology. Any one of the foregoing memory devices described above with reference to FIGS. 3-6 can be incorporated into any of a myriad of larger and/or more complex systems, a representative example of which is system 780 shown schematically in FIG. 7. The system 780 can include a memory device 700, a power source 782, a driver 784, a processor 786, and/or other subsystems or components 788. The memory device 700 can include features generally similar to those of the memory device described above with reference to FIGS. 3-6, and can therefore include various features for performing a direct read request from a host device. The resulting system 780 can perform any of a wide variety of functions, such as memory storage, data processing, and/or other suitable functions. Accordingly, representative systems 780 can include, without limitation, hand-held devices (e.g., mobile phones, tablets, digital readers, and digital audio players), computers, vehicles, appliances and other products. Components of the system 780 may be housed in a single unit or distributed over multiple, interconnected units (e.g., through a communications network). The components of the system 780 can also include remote devices and any of a wide variety of computer readable media.

From the foregoing, it will be appreciated that specific embodiments of the technology have been described herein for purposes of illustration, but that various modifications may be made without deviating from the disclosure. In addition, certain aspects of the new technology described in the context of particular embodiments may also be combined or eliminated in other embodiments. Moreover, although advantages associated with certain embodiments of the new technology have been described in the context of those embodiments, other embodiments may also exhibit such advantages and not all embodiments need necessarily exhibit such advantages to fall within the scope of the technology. Accordingly, the disclosure and associated technology can encompass other embodiments not expressly shown or described herein.

In the illustrated embodiments above, the memory devices have been described in the context of devices incorporating DDR based DRAM. Memory devices configured in accordance with other embodiments of the present technology, however, can include other types of suitable storage media in addition to or in lieu of DDR DRAMs, such as NAND or NOR-based storage media, non-volatile storage media, magnetic storage media, phase-change storage media, ferroelectric storage media, etc.

The term "processing" as used herein includes manipulating signals and data, such as writing or programming, reading, erasing, refreshing, adjusting or changing values, calculating results, executing instructions, assembling, transferring, and/or manipulating data structures. The term data structures includes information arranged as bits, words or code-words, blocks, files, input data, system generated data, such as calculated or generated data, and program data. Further, the term "dynamic" as used herein describes processes, functions, actions or implementation occurring during operation, usage or deployment of a corresponding device, system or embodiment, and after or while running manufacturer's or third-party firmware. The dynamically occurring processes, functions, actions or implementations can occur after or subsequent to design, manufacture, and initial testing, setup or configuration.

The above embodiments are described in sufficient detail to enable those skilled in the art to make and use the embodiments. A person skilled in the relevant art, however, will understand that the technology may have additional embodiments and that the technology may be practiced without several of the details of the embodiments described above with reference to FIGS. 3-7.

From the foregoing, it will be appreciated that specific embodiments of the technology have been described herein for purposes of illustration, but that various modifications may be made without deviating from the disclosure. In addition, certain aspects of the new technology described in the context of particular embodiments may also be combined or eliminated in other embodiments. Moreover, although advantages associated with certain embodiments of the new technology have been described in the context of those embodiments, other embodiments may also exhibit such advantages and not all embodiments need necessarily exhibit such advantages to fall within the scope of the technology. Accordingly, the disclosure and associated technology can encompass other embodiments not expressly shown or described herein.

We claim:

1. A dynamic random-access memory (DRAM) device, comprising:
    memory banks configured to store data and provide access to the stored data; and
    a data control circuit coupled to the memory banks, the data control circuit configured to:
        determine a pointer based on a received command, wherein the pointer includes information that corresponds to a target memory bank associated with the received command;
        route a set of bits corresponding to the received command to or from the target memory bank using the pointer; and
        reduce transitions of one or more signals based on the pointer, wherein the one or more signals are associated with the set of bits.

2. The DRAM device of claim 1, wherein the data control circuit is configured to route the set of bits for a page mode operation or a burst mode operation.

3. The DRAM device of claim 1, wherein the data control circuit is directly connected to the memory banks through one or more data buses.

4. The DRAM device of claim 1, wherein the data control circuit includes one or more shared drivers, wherein each of the shared drivers are connected to a subset of multiple memory banks or a subset of multiple bank groups.

5. The DRAM device of claim 1, further comprising:
    command-address pads coupled to the data control circuit, the command-address pads configured to receive the command and an address associated with a memory operation corresponding to the set of bits;
    one or more data masks coupled to the data control circuit, the one or more data masks each configured to cover or preserve a portion of a data unit;
wherein:
    the memory banks are configured to store and access a set of bits according to the data unit; and
    the data control circuit is configured to manage communication between the command-address pads, the one or more data masks, and the memory banks.

6. The DRAM device of claim 5, wherein the data control circuit is configured to:

intercept the command and the address for local control of the data operation;
send the command to the one or more data masks for global control of the data operation; and
control one or more clock signals for processing the set of bits.

7. The DRAM device of claim 1, wherein the data control circuit is configured to generate a single global flow-through clock pulse that is sustained over multiple global clock periods.

8. The DRAM device of claim 1, wherein:
    the memory banks comprise two or more bank groups; and
    the data control circuit is configured to generate a single local flow-through clock pulse that controls operations of a bank group or a memory bank targeted by the set of bits and the received command, wherein the single local flow-through clock pulse is sustained over multiple local clock periods.

9. The DRAM device of claim 8, wherein the single local flow-through clock pulse is sustained over a processing duration associated with a set of consecutively communicated bits.

10. The DRAM device of claim 8, wherein the data control circuit is configured to turn off clocks for other bank groups that are not targeted by the received command.

11. The DRAM device of claim 7 or 8, wherein the single global flow-through clock pulse and the single local flow-through clock pulse do not include transitions while they are sustained.

12. The DRAM device of claim 1, wherein the DRAM device includes a semiconductor die includes the data control circuit and the memory banks, wherein the data control circuit is located at one continuous portion of the semiconductor die.

13. The DRAM device of claim 12, wherein the data control circuit is located at a center area of the semiconductor die, wherein the center area does not include peripheral edges of the semiconductor die.

14. The DRAM device of claim 13, wherein the data control circuit includes logic configured to control operations for multiple memory banks or multiple bank groups.

15. The DRAM device of claim 1, wherein the DRAM is configured for a double data rate (DDR) interfacing scheme.

16. A method of operating a dynamic random-access memory (DRAM) device, the method comprising:
    receiving a set of data bits associated with a command;
    determining a pointer corresponding to the command, the pointer includes information that corresponds to a target memory bank associated with the command;
    using data control circuit coupled to memory banks,
        routing a set of bits to or from the target memory bank using the pointer, and
        reducing transition of one or more signals based on the pointer, wherein the one or more signals are associated with the set of bits.

17. The method of claim 16, wherein:
    receiving the set of data bits includes receiving a consecutive set of bits corresponding to a page mode operation or a burst mode operation; and
    routing the set of bits includes routing the consecutive set of bits to the target memory bank.

18. The method of claim 17, further comprising:
    intercepting the command and an address for local control of the data operation;
    sending the command to one or more data masks for global control of the data operation; and control one or more clock signals for processing the set of bits.

19. The method of claim 16, wherein routing the set of bits includes generating a single global flow-through clock pulse that is sustained, without any transitions, over multiple global clock periods.

20. The method of claim 16, wherein routing the set of bits includes generating a single local flow-through clock pulse that controls operations of a bank group or a memory bank targeted by the set of bits and the command, wherein the single local flow-through clock pulse is sustained, without any transitions, over multiple local clock periods.

* * * * *